Oct. 29, 1963
W. A. RAY ET AL
3,108,532
SYSTEM FOR OPERATING A ROTARY SPIT MECHANISM
Filed June 30, 1958
4 Sheets-Sheet 3
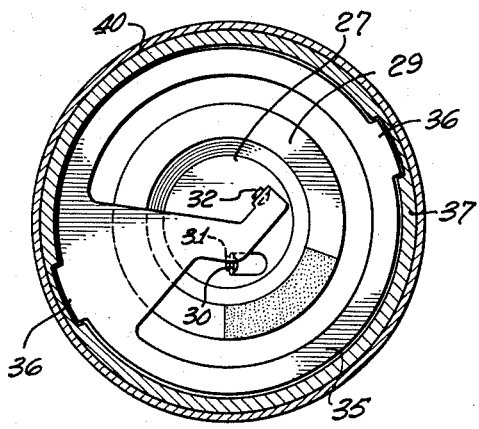
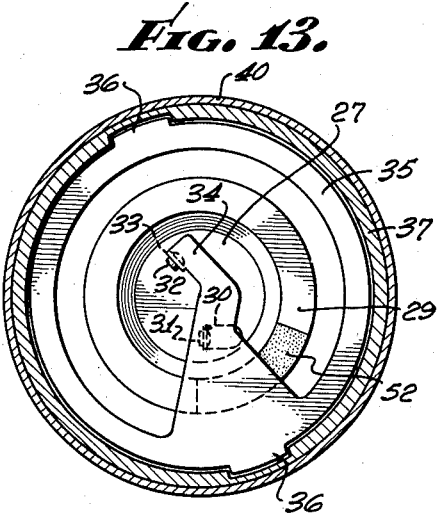
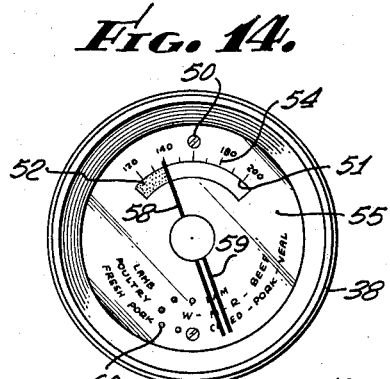
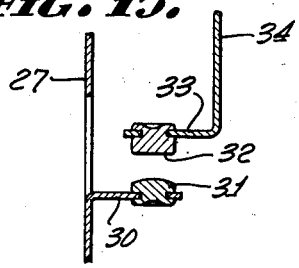
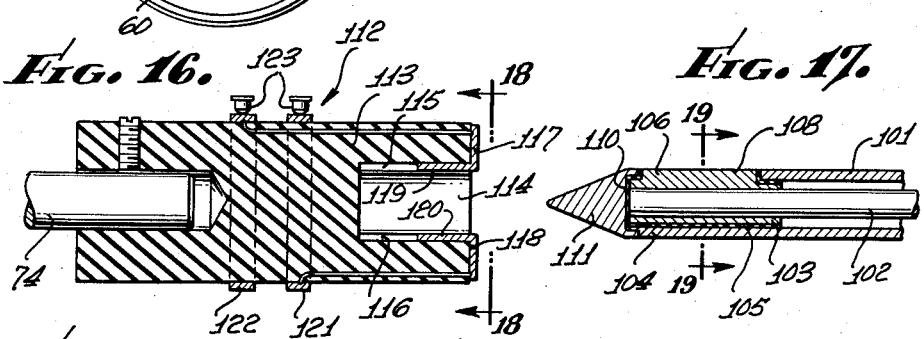
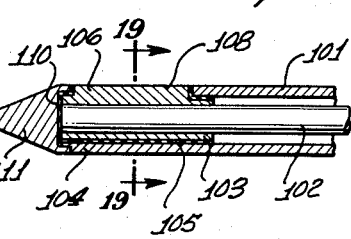
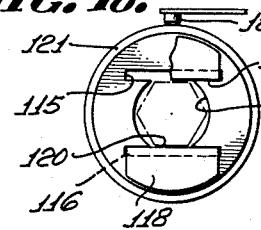
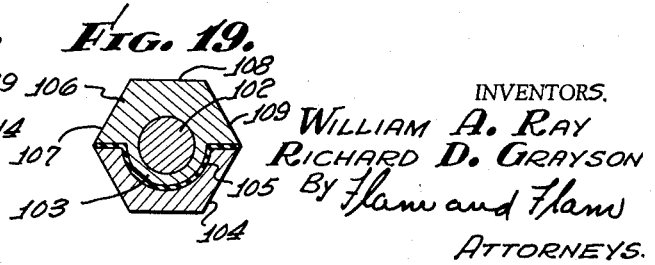
INVENTORS.
WILLIAM A. RAY
RICHARD D. GRAYSON
By Flam and Flam
ATTORNEYS.

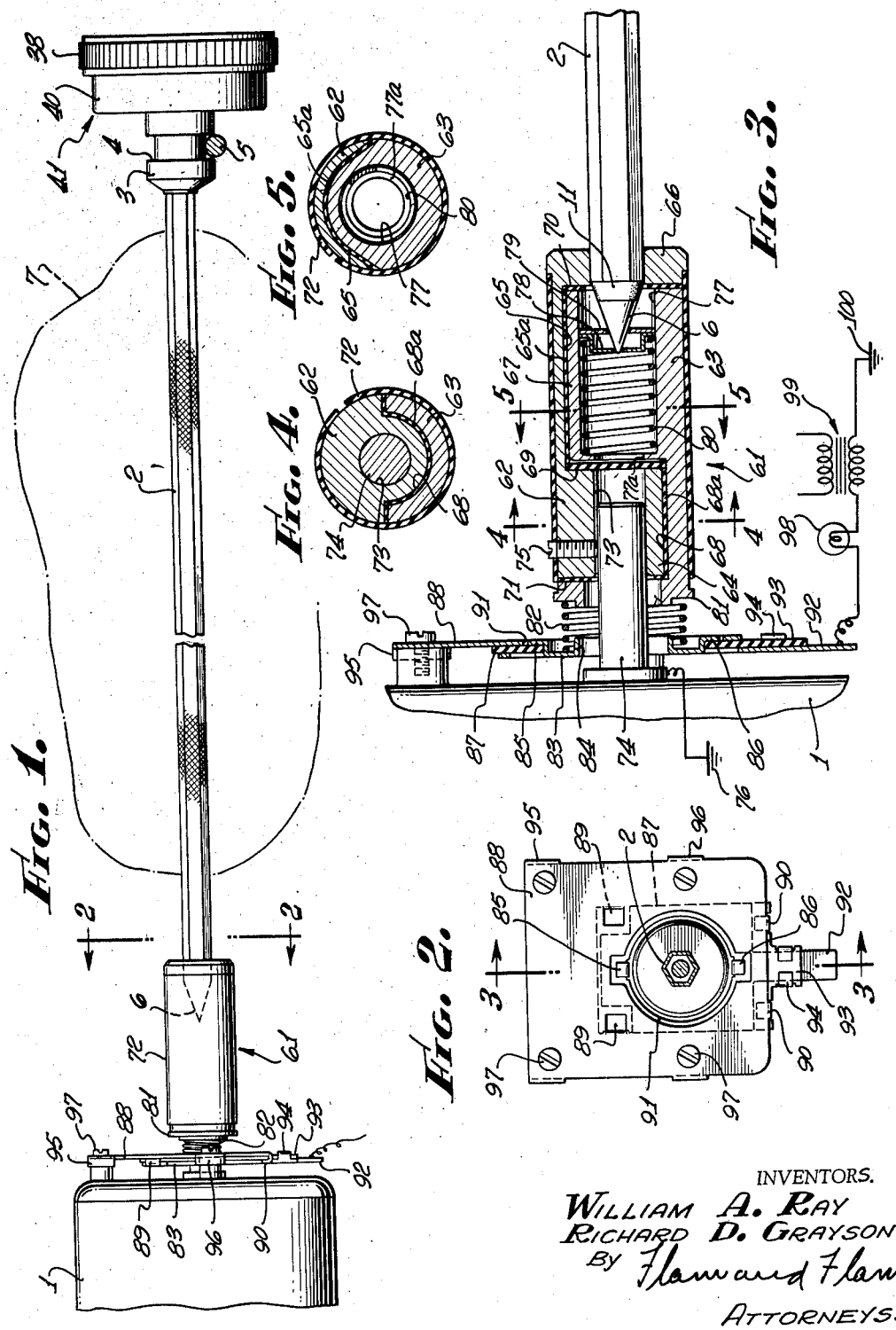

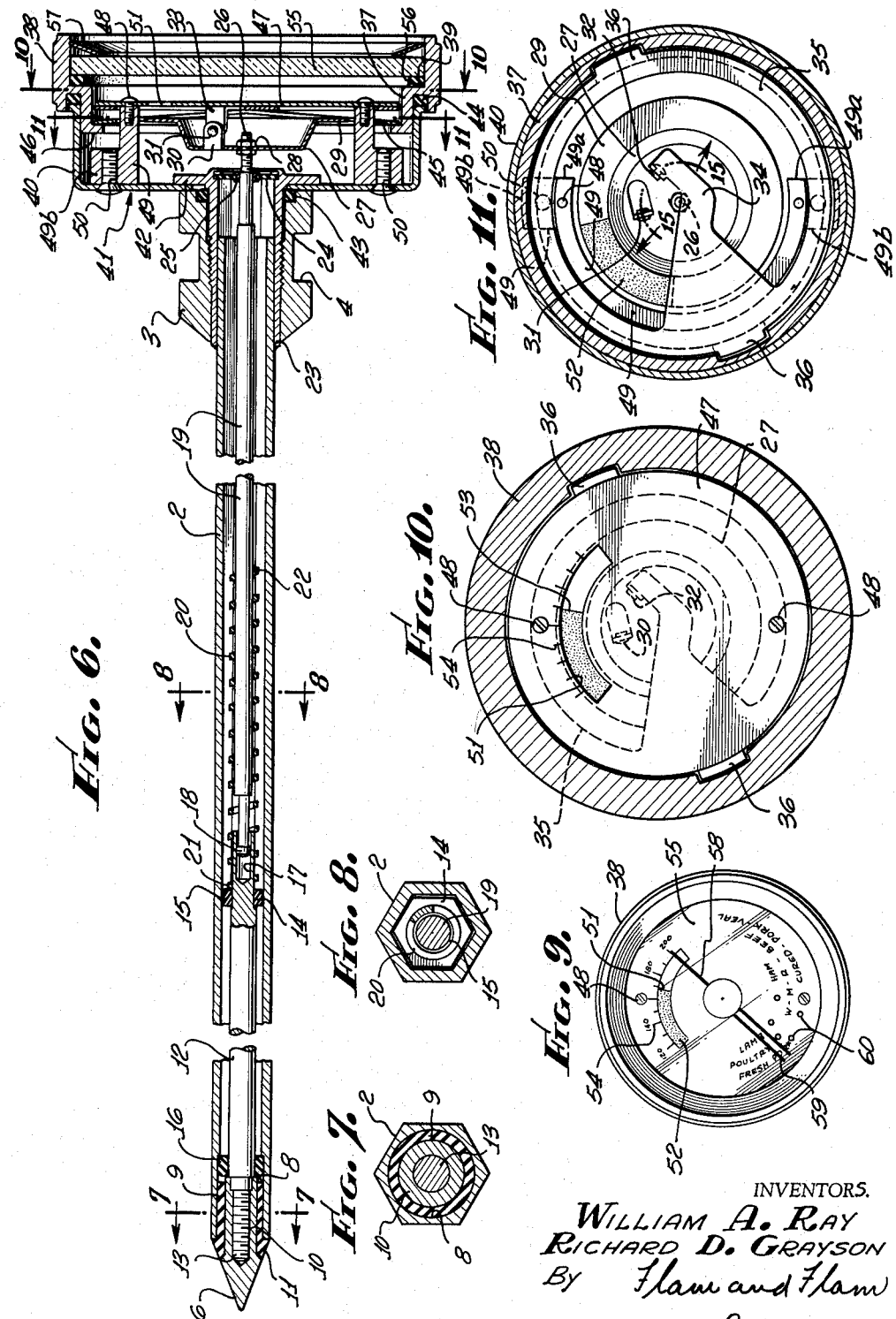

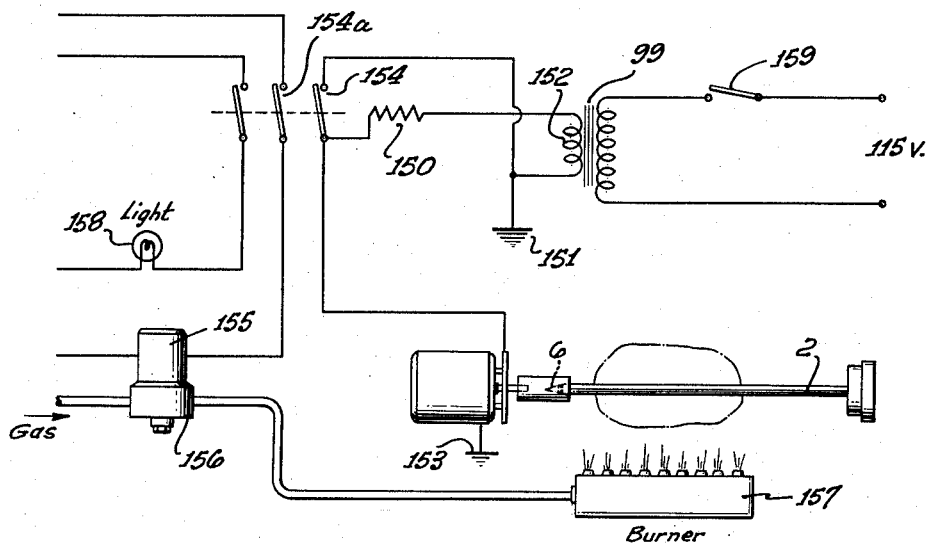
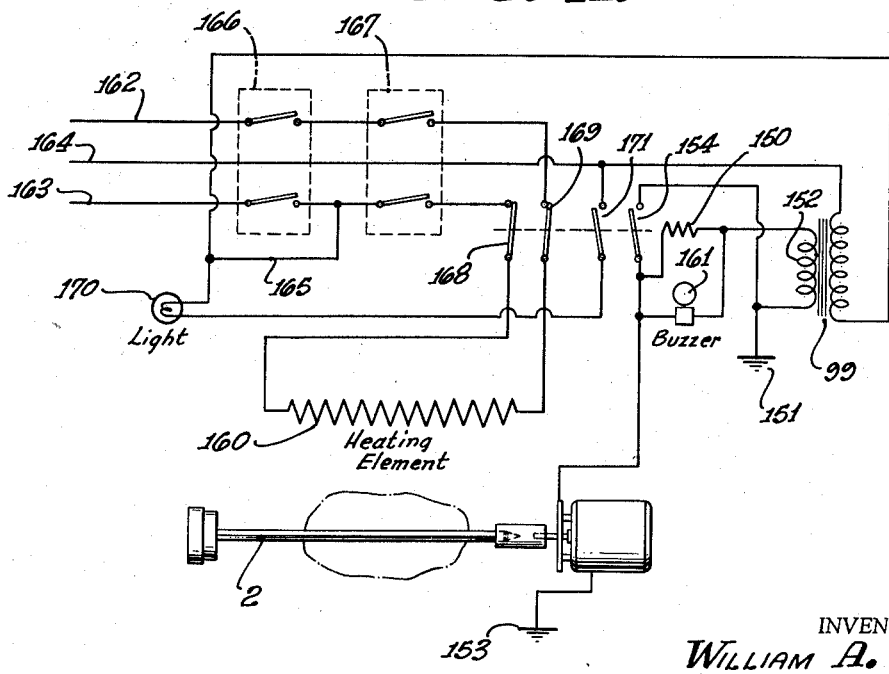

United States Patent Office

3,108,532
Patented Oct. 29, 1963

3,108,532
SYSTEM FOR OPERATING A ROTARY
SPIT MECHANISM
William A. Ray, North Hollywood, and Richard D. Grayson, La Canada, Calif., assignors to General Controls Co., a corporation of California
Filed June 30, 1958, Ser. No. 745,386
10 Claims. (Cl. 99—421)

This invention relates to the art of cooking, and especially to the broiling or roasting of animal food by the aid of a rotary spit which supports the food. Such rotary spit mechanisms, in connection with grids superposed over a gas or electric burner, or its equivalent, are now quite widely used; such mechanisms, for example, may be used in connection with range ovens.

In the simplest form of these prior devices, the cooking is continued until visual inspection of the meat being barbecued indicates that the desired degree of cooking has been effected; or else a timing control device is used to terminate the cooking by shutting off the fuel, or by deenergizing the heating element. Such crude determinations are not satisfactory.

It is one of the objects of this invention to provide a controlling or signaling system, or both, for such rotary spits that can not only apprise the cook or operator when the cooking is effected, but which will also operate a valve or a circuit breaker for terminating the supply of heat to the food.

It is another object of this invention to provide a system of this character that can be effectively used in a very simple manner, without the necessity of observing any special precautions; the spit is simply passed through the meat to be cooked, a simple adjustment is made, conforming to the specific type of meat being cooked, or to the degree of cooking desired; then the spit is coupled to a source of rotary motion in proximity to the source of heat. When the meat is cooked to the desired degree, a signal such as a bell or light, is electrically energized, and the heating means may also be rendered ineffective.

In order to accomplish these results, the spit is so constructed as to include a temperature-responsive element, such as a bimetal, which is subjected to the heat attained by the meat at the place where it is in contact with the spit. The bimetal is conveniently disposed within the spit, which is purposely made hollow. The bimetal serves to operate a circuit controller which is adjustable in such a way as to effect the energization of the controlling or indicating circuit whenever a predetermined temperature is reached.

Accordingly, it is another object of this invention to provide a spit structure that conveniently houses the control elements.

It is still another object of this invention to make it possible to lead current to the control elements by the simple process of coupling the spit to a source of rotary motion. Thus, for example, the spit may have a cross-section corresponding to a regular polygon, cooperating with a similar recess or socket formed in the end of a rotary member driven by a small electric motor.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:
FIGURE 1 is an elevation of a spit installation incorporating the invention, the spit being partly broken away in order to reduce the size of the figure;
FIG. 2 is a sectional view, taken along a plane corresponding to line 2—2 of FIG. 1;
FIG. 3 is an enlarged fragmentary sectional view, taken along a plane corresponding to line 3—3 of FIG. 2;
FIGS. 4 and 5 are sectional views taken along planes corresponding to lines 4—4 and 5—5 of FIG. 3;
FIG. 6 is a longitudinal sectional view of the spit structure, part of the spit structure being broken away to reduce the size of the figure;
FIGS. 7, 8, 10 and 11 are sectional views, taken along planes corresponding to lines 7—7, 8—8, 10—10 and 11—11 of FIG. 6;
FIG. 9 is an end view of the spit structure showing the dial, and taken from the righthand side of FIG. 6;
FIGS. 12 and 13 are views similar to FIG. 11, illustrating alternative adjusted positions of an angularly adjustable contact member utilized in the structure shown in FIG. 6;
FIG. 14 is a view similar to FIG. 9, illustrating a different setting of the temperature to be attained before a signal is energized;
FIG. 15 is an enlarged sectional view, illustrating the relatively movable contact members which control the energization of a control circuit and taken along a plane corresponding to line 15—15 of FIG. 11;
FIG. 16 is a sectional view of a modified form of driving coupling that may be utilized with the invention;
FIG. 17 is a fragmentary sectional view of a spit showing the arrangement of the end of the spit structure adapted to cooperate with the driving coupling shown in FIG. 16;
FIG. 18 is an end view of the coupling shown in FIG. 16 taken from the plane indicated by the lines 18—18 of FIG. 16, but with one of the contact members partly broken away;
FIG. 19 is a sectional view, taken along a plane corresponding to line 19—19 of FIG. 17; and
FIGS. 20 and 21 are wiring diagrams illustrating how the spit device may be used to serve as a circuit controller for signaling or for controlling, or both.

Referring to FIGURE 1, there is illustrated an electric motor 1 which is intended to rotate a spit structure including a spit rod 2. This spit rod 2 has a right-hand end portion provided with an outer sleeve 3 (FIGS. 1 and 6) attached as hereinafter explained to the spit structure. The sleeve 3 is provided with an annular groove 4, by the aid of which it may be supported upon a horizontal wire member 5 forming a part of the structure above which the spit rotates.

The spit structure is provided with a sharp tip or point 6 (FIGS. 3 and 6) which is adapted to pierce and pass through the food material which is to be barbecued. The food material is indicated in phantom lines by reference character 7 in FIG. 1. This may be beef, lamb, pork, veal, poultry, or the like.

Preferably the rod 2 is formed of a hollow rod of hexagonal cross-section as shown most clearly in FIG. 8. The intermediate portion of the exterior surface of this hexagonal rod may be roughened where it passes through the meat 7 so as to retard or prevent inadvertent displacement of the meat 7 with respect to the spit structure.

The tip or point 6 as hereinafter explained, serves as one of a number of elements for supporting a thermo-responsive element which in turn operates a circuit controller. This circuit controller serves to energize a circuit for indicating or control whenever the temperature within the hexagonal rod 2 reaches a preset value. This temperature is attained by transfer of heat from the cooking meat 7, and is intended to be indicative of the completion of the cooking operation.

The point 6 is insulatingly mounted within the left-hand end of the rod 2 so that it may be utilized effectively as one of the elements in the control circuit. Thus, as shown most clearly in FIG. 7, the rod 2 is provided with a circular bore 8 which accommodates an insulation sleeve 9. This insulation sleeve 9 in turn accommodates an integral circular shank 10 extending inwardly from the tip 6. The insulation sleeve 9 is provided with a relatively wide conical exterior surface 11 (see also FIG. 3) separating the left-hand end of the rod 2 from the point 6. This conical surface 11 forms a continuation of the exterior surfaces of the point 6. The sleeve 9 is appropriately adhered to the metal parts as by a thermosetting plastic adhesive.

A round bar 12 (FIG. 6) is arranged axially of the rod 2 by the aid of its threaded end 13. This threaded end 13 is received in the shank 10 of the point 6. There is clearance, as indicated most clearly in FIG. 8, between the periphery of the rod 12 and the internal surface of the rod 2. In order to maintain this clearance properly, an insulation spacer 14 is disposed over the reduced end 15 of the bar 12 and is firmly held on the rod 2. This insulation spacer 14 serves to support the bar 12 at an intermediate point. An insulation ring 16 (FIG. 6) made of rubber or the like is disposed around the periphery of the bar 12 adjacent its left-hand end and between this bar 12 and the interior surface of the rod 2.

The right-hand end of the reduced portion 15 is provided with a bore 17. This bore 17 serves as a bearing for the left-hand end 18 of an angularly movable shaft 19. This left-hand end carries a cylindrical terminal bearing joined to the reduced end of the shaft 19. This shaft 19 is arranged to be angularly moved in accordance with variations in temperature within the rod 2. For example, a spirally wound bimetal member 20 has one of its ends 21 anchored to the extension 15. Its right-hand end 22 is anchored to the shaft 19.

Accordingly, as the temperature within the rod 2 varies, the shaft 19 is rotated by the right-hand end 22, in one or the other direction.

The rod 2 carries at its right-hand end an inner sleeve 23 which telescopes over the rod 2. At its right-hand end and within an annular groove in the interior surface of the sleeve 23, there is accommodated a washer 24 of insulation material, carrying a central metal eyelet 25. This metal eyelet serves as a bearing for the reduced right-hand end of the shaft 19. Eyelet 25 has an interior cylindrical bearing surface. The washer 24 is itself supported at its outer edge by crimping the end of the sleeve 23 over this edge.

The shaft 19 terminates in a threaded end 26. A contact-carrying member 27 is mounted on this end 26 and held in position by the aid of the nuts 28. This member 27 is formed of thin sheet metal. Its center portion is dished or cupped, providing an outer rim or flange 29 (see also FIGS. 11, 12 and 13). Struck upwardly from the bottom of the cup member 27 is an ear 30 (see particularly FIG. 15) carrying a contact member 31.

Since the ear 30 is formed by a punching and bending operation to cause the ear 30 to extend in a direction parallel to the axis of the shaft 19, the contact member 31 is spaced radially from this axis.

The contact member 31 cooperates with an angularly adjustable contact member 32 mounted on an ear 33. This ear 33 extends at right angles from an arm 34 extending inwardly from an integral ring 35 which supports the arm.

In the position of FIG. 11 the contact member 31 is intended to move in a clockwise direction upon an increase in temperature to complete the energizing of the control circuit via contact member 32 upon a relatively small angular movement.

In the position of FIG. 12, the contact member 31 is indicated as displaced by a relatively large angle from the contact member 32 corresponding to a cooling down of the bimetal member 20. In FIG. 13, an angular adjustment of ring 35 has brought the contact member 32 closer angularly to the contact member 30 so that the circuit controller energizes the control circuit at a lower temperature than when the adjustment is as indicated in FIG. 12.

In order to provide for the adjusting movement, the ring 35 is provided with two diametrically opposite projections 36 that are received in corresponding slots in a flange 37 formed integrally with an adjustment ring 38 (FIG. 6). This adjustment ring 38 is joined to the flange 37 by the aid of a radial flange 39. Furthermore, the flange 37 is shown as telescoping and rotatable within a flange 40 of a casing member 41. This casing member 41 is appropriately made of sheet metal and has an aperture through which the sleeve 23 may pass. The casing member 41 is clamped to a flange 42 of the sleeve 23 by the aid of external sleeve 3. This sleeve 3 is threaded over the sleeve 23. An O-ring 43 is disposed between the two sleeves 3 and 23.

An O-ring 44 is disposed around the flange 37 and abuts the outwardly turned edge of the flange 40. A slight pressure, as hereinafter described, is provided, urging flange 37 into flange 40, slightly compressing the O-ring 44. In this way, a slight frictional restraint against inadvertent movement of ring 38 is provided.

The ring 38 is thus angularly adjustable within the housing 40. This ring 38 is urged resiliently inwardly by the aid of a spring cupped washer 45 that engages the inwardly directed edge 46 of the flange 37. The center portion of the spring washer 45 abuts the inner side of a dial plate 47. This dial plate 47 is attached as by screws 48 (see also FIG. 10) to the ends of a bracket 49 (see also FIG. 11). This bracket 49 forms an interrupted ring or arc, having ends 49a (FIG. 11). At its ends, this bracket carries lugs 49b (FIGS. 6 and 11) which provide means for attaching the bracket 49 to casing 41, as by screws 50.

The adjustable contact-carrying arm 34 has its right-hand surface adjacent the inner surface of the dial plate 47.

The dial plate 47 has an arcuate window or opening 51 (FIGS. 9, 10 and 14). Through this window is visible the flange 29 of the contact-carrying member 27. This flange 29 may carry a colored arcuate portion 52 having an edge 53 (FIG. 10) serving as a pointer and cooperating with the graduation marks 54 on the upper edge of the opening 51.

The ring 38 appropriately supports a transparent window 55 (FIG. 6) which is held in place against an O-ring 56 by the aid of a spring retainer 57. On the exterior surface of the transparent window 55 there are etched or otherwise formed radial lines 58 and 59 (FIGS. 9 and 14). The line 58 serves as a pointer cooperating with the graduation marks 54 (FIGS. 10 and 14) to indicate the temperatures at which the adjusted position of the contact member 32 will be engaged by contact member 31. Pointer 59 is formed by two parallel lines cooperating with dots or small circles 60 on the lower half of the dial plate 47. Appropriate legends may also be formed adjacent these dots 60 to indicate the proper position of the adjustable ring 38 for the cooking of the food items identified by these legends.

The point 6 as hereinbefore mentioned is adapted to be received in the drive coupling 61 (FIGS. 1 and 3), and to be rotated thereby. This drive coupling is so arranged that the rod 2 is grounded to the frame of the motor 1, while the tip or point 6 can form a connection to an indicating device, as hereinafter described.

The coupling member 61 primarily comprises the halves 62 and 63 made of electrically conducting metal (see also FIGS. 4 and 5). The half 62 is provided with a left-hand projection or boss 64 and a right-hand cavity 65 terminating in a right-hand flange 66. Interfitting the cavity 65 is the projection or boss 67 of the member 63. This projection 67 is axially spaced from a cavity 68 formed on member 63, and into which projection 64 fits. Appropriate insulation washers 69, 70 and 71 isolate the two coupling members 62 and 63. Furthermore, an insulation sleeve 72 encircles both of the members 62 and 63. Insulation material 65a and 68a line the two recesses 65 and 68.

The member 62 has at its left-hand end an aperture 73 for the accommodation of the shaft 74 of the motor 1. A set screw 75 serves to couple the coupling structure 61 to the shaft 74.

The flange 66 has a hexagonal aperture into which the rod 2 enters. This rod 2 is thus placed into electrical contact with the coupling member 62. Accordingly, by virtue of this connection, the adjustable contact member 32 is grounded to the frame of the motor 1 as indicated by the ground connection 76 (FIG. 3).

The tip 6 (which as hereinbefore explained is isolated from the rod 2) is electrically connected to the other contact member 31, and is also electrically connected to the coupling member 63. Thus, tip 6 engages a contact cup 78 which is located in recess 77 formed in coupling member 63. This cup 68 is joined to a washer 79. This washer 79 permits the entry of the tip 6 into the cup 78 and also provides reinforcement for the edge of the cup. A compression spring 80 is disposed in the recess 77 and urges the cup 78 toward the right. This compression spring is shown in FIG. 3 as compressed by the action of the tip 6. A flange 77a at the left-hand edge of aperture or recess 77 serves as an abutment for spring 80.

A flange 81 is provided at the left-hand end of the member 63. This flange is in electrical contact with a contact spring 82. This contact spring 82 engages a contact plate 83. Plate 83 is formed with a central flange 84 surrounding but spaced from the shaft 74. Contact plate 83 is furthermore provided with a pair of ears 85 and 86 (see also FIG. 2) for holding an insulation plate 87 in place. This insulation plate, shown most clearly in FIG. 2, serves to support a supporting plate 88 as by the aid of clips 89 and 90 formed on the plate 88. The plate 88 is provided with a central opening 91 clearing the ears 85. Insulation plate 87 thus isolates the supporting plate 88 from contact plate 83.

The contact plate 83 has a downwardly extending terminal member 92. The insulation plate 87 has an extension 93 overlying the upper portion of the terminal 92 and attached to it as by means of the ears 94 formed on the terminal member 92.

The supporting plate 88 may be provided with the ears 95 and 96 by the aid of which the drive coupling assembly may be mounted as by screws 97 to the motor frame 1.

By angularly moving the ring 38 (FIG. 6), the position of the adjustable contact member 32 can be set so as to correspond with the cooking temperature that is to be reached before an indicator device is energized. When this temperature is reached, the contact members 31 and 32 complete a circuit (FIG. 3) from ground 76, through shaft 74, coupling member 62, rod 2, casing 41, contact arm 34, contact members 32 and 31, shaft 19, bi-metal member 20, supporting rod 12, tip 6, cup 78, spring 80, coupling member 63, flange 81, contact spring 82, contact plate 83, terminal 92, indicator or controller 98 (a lamp, buzzer or circuit breaker), secondary winding of a step-down transformer 99, and ground 100.

In the form shown in FIGS. 16, 17, 18 and 19, the spit structure includes a hollow hexagonal rod 101 and a central shaft supporting element 102. This element 102 corresponds, in function to the bar support 12 illustrated in FIG. 6.

A sleeve 103 surrounds the element 102 and is insulated from the rod 101. The rod 101 has a left-hand extension 104 (see also FIG. 19) forming a cavity which accommodates the sleeve 103. This cavity has an exterior peripheral surface corresponding to three of the six sides of a regular hexagon of the same dimensions as rod 101. An insulation layer 105 (FIG. 19) is provided for isolating the sleeve 103 from the rod 101.

The sleeve 103 furthermore has an upper portion 106 having a three-sided form conforming to the corresponding three sides of the hexagonal rod 101, and forming a complete hexagon with extension 104. The flat surfaces 107, 108 and 109 of the sleeve 103 thus form continuations of the corresponding hexagonal surfaces of the rod 101.

An end insulation member 110 serves to isolate the tip 111.

The drive coupling structure 112 is formed in this instance by an insulation body 113 receiving the motor shaft 74 as in the form previously described. At the opposite end of the insulation body 113 there is a circular recess 114. Slots 115 and 116 on diametrically opposite sides of the circular recess 114 are in communication with the recess 114. Accommodated in the slots and attached therein are connection clips 117 and 118. The parallel spaced surfaces 119 and 120 (FIG. 16) of these clips correspond in spacing to the distance across opposite faces of the hexagon defined by the member 106 and the extension 104. Accordingly, no matter which of the surfaces of these two members 104 and 106 are in contact with these clips, one of the clips 117 or 118 will connect to the rod 101, and the other clip will connect to the sleeve 106, since these clips contact diametrically opposite sides of the hexagon perimeter of the combination of the sleeve 106 and projection 104.

Connections to these two elements may be formed by the aid of collector rings 121 and 122 upon which bear the stationary brushes 123.

The circuit elements leading to the contact members 31 and 32 (FIG. 15) are otherwise the same as in the form previously described.

In FIG. 3 an elementary circuit is indicated utilizing the thermostatically controlled contacts for completing a circuit for a signaling device 98. When it is desired as well to shut off the heat, a heating control circuit such as illustrated in FIGS. 20 and 21 may be used.

In FIG. 20 the spit member 2 is shown as completing a connection to ground for energizing an electromagnet coil 150 of a relay. When the bimetal contacts close, a circuit for the coil 150 is completed through a ground connection 151, through the secondary winding 152 of the transformer 99. The ground connection 153 for the left-hand side of the coil 150 is established by the aid of the bimetal structure hereinbefore described.

This relay 150 closes a circuit controller 154 which serves as a holding circuit for the coil 150. It also serves to close a circuit via circuit controller 154a for the electromagnet coil 155 of a valve 156 which, when energized, closes the valve 156. This valve 156, when coil 155 is unenergized, supplies gaseous fuel to a burner 157 located beneath the spit 2. Accordingly, when the temperature reaches the desired value within the spit 2, the burner 157 is shut down.

If desired, a visual signal such as a lamp 158 is energized when the relay coil 150 is energized.

A manually operated switch 159 is also indicated for energizing the primary winding of the transformer 99.

In FIG. 21 the heating is intended to be effected by an electric heating element 160. The circuit for the secondary winding 152 and relay coil 150 is the same as before. In this instance, a buzzer or audible signal device 161 is energized whenever the relay 150 is energized.

The heating element 160 is fed from the outer mains 162 and 163 corresponding to the outer conductors of a three-wire system. The intermediate conductor 164 leads to the primary coil of transformer 99, and the circuit to one of the outer conductors 163 is completed through a conductor 165. In this way the transformer 99 is fed with an electromotive force which is substantially one-half of the value of the electromotive force between the mains 162 and 163.

The heating element 160 is connected through the manually operated double-pole switch structure 166 corresponding to the oven or broiler controlling switch, as well as through a double-pole clock control switch 167 when such a switch is used. The circuit is completed through the normally closed circuit controllers 168 and 169 which are operated by the relay coil 150.

When this relay coil 150 is energized in response to the establishing of the ground connection 153, the circuit controllers 168 and 169 are opened in order to deenergize the heating element 160.

At the same time, an auxiliary light signal 170 is also energized by way of a normally open circuit controller 171.

The inventors claim:

1. In a spit structure: a metallic hollow rod; a pointed tip carried by one end of the rod; an insulation member isolating the tip from the rod; a coiled bimetal member within the rod and in electrical contact with the tip; a first contact member carried by the bimetal member to cause the contact member to move arcuately in accordance with the temperature of the bimetal member; an angularly adjustable second contact member cooperating with the first contact member; and an angularly movable support for the second contact member and mounted on the hollow rod; said second contact member being electrically connected to the rod.

2. The combination as set forth in claim 1, with a rotary socket member for the reception of the tip end of the spit structure; said socket having insulated conducting elements respectively connecting to the tip and to the rod.

3. In a spit structure: a hollow metallic rod; a metal tip mounted in one end of the rod; an insulation member between the tip and the rod; a metal support mounted in the tip and extending lengthwise of the rod; a rotary shaft having one end supported in the metal support; a coiled bimetal member anchored at its opposite ends respectively to the support and to the shaft; an electrical contact member mounted on the shaft; and a cooperating electrical contact member carried by the hollow rod.

4. In a structure providing a rotary spit: a hollow metallic rod; a metal tip insulatingly mounted in one end of the rod; a metal support mounted in the tip and extending lengthwise of the rod; a rotary shaft having one end supported in the metal support; a coiled bimetal member anchored at its opposite ends respectively to the support and to the shaft; a contact member mounted on the shaft; a cooperating contact member carried by the hollow rod; a rotary socket member having two metallic parts insulated from each other and having a recess accommodating said one end of the rod; and a conducting member contacted by the tip and in electrical conducting relation to the other part of the socket member.

5. In a drive coupling structure for a rotary spit: a pair of metallic interfitting body members; each member having an end flange respectively defining the ends of the structure; each body member having an axially spaced cavity and an adjacent projection; the projection of one body member fitting into the cavity of the other; insulation material isolating the body members; one of the projections being adapted to provide a drive connection; and the other projection having a recess adapted to receive the end of a spit.

6. The combination as set forth in claim 5, with the addition of a spring-pressed contact member in the recess for electrically connecting the tip to the said other projection.

7. The combination as set forth in claim 5, with the addition of a stationary terminal plate; and a contact spring between said plate and that flange which is adjacent the drive connection.

8. In combination: a hollow spit structure having a regular hexagonal cross-section and made of conducting material; a center rod of conducting material, and located in the spit structure; means for insulatingly supporting the center rod at one end of the spit structure; and means forming an electrical contact with the center rod and having a surface conforming to three adjacent sides of the hexagon of the spit structure, said electrical contact means being insulated from the spit structure.

9. The combination as set forth in claim 8, with the addition of a drive coupling structure for the spit structure, including an insulation member having an aperture to receive the end of the spit structure; and a pair of contact members disposed in the aperture having flat faces that are parallel and spaced apart by a distance corresponding to the distance between opposite faces of the regular hexagon of the spit structure.

10. In combination: an angularly movable rod; temperature-responsive means for moving the rod; a first contact member carried by one end of the rod; said contact member being spaced from the axis of the rod; a casing structure; a second contact member mounted by the casing for angular adjustment about said axis, for cooperating with said first contact member; a peripheral ear carried by the angularly adjustable contact member; said angularly adjustable contact member also having a ring member that has a recess for the ear for moving the angularly adjustable contact member; said ring member also having a flange telescoping within a flange carried by the casing member; and a spring washer for urging the ring flange into the casing member flange.

References Cited in the file of this patent

UNITED STATES PATENTS

| | | |
|---|---|---|
| 1,067,005 | Denereaz | July 8, 1913 |
| 1,976,954 | Mantz | Oct. 16, 1934 |
| 2,220,810 | Bright | Nov. 5, 1940 |
| 2,266,277 | Seegars et al. | Dec. 16, 1941 |
| 2,558,294 | Finizie | June 26, 1951 |
| 2,731,529 | Liens | Jan. 17, 1956 |
| 2,787,948 | Mathis | Apr. 9, 1957 |
| 2,820,130 | Dadson | Jan. 14, 1958 |
| 2,854,918 | Merritt | Oct. 7, 1958 |